United States Patent [19]
Frye

[11] Patent Number: 4,737,613
[45] Date of Patent: Apr. 12, 1988

[54] LASER MACHINING METHOD

[75] Inventor: Richard W. Frye, Coventry, Conn.

[73] Assignee: United Technologies Corporation, Hartford, Conn.

[21] Appl. No.: 88,446

[22] Filed: Aug. 24, 1987

[51] Int. Cl.$^4$ .............................................. B23K 26/00
[52] U.S. Cl. ........................ 219/121 LN; 219/121 LY
[58] Field of Search ................. 219/121 LG, 121 LN, 219/121 LL, 121 LK, 121 LY, 121 EG, 121 EH

[56] References Cited

U.S. PATENT DOCUMENTS

| | | | |
|---|---|---|---|
| 4,197,443 | 4/1980 | Sidenstick | 219/69 |
| 4,288,680 | 9/1981 | Röder | 219/121 LG |
| 4,317,023 | 2/1982 | Gryskiewicz | 219/121 LN |
| 4,501,949 | 2/1985 | Antol et al. | 219/121 |
| 4,555,610 | 11/1985 | Polad et al. | 219/121 |

FOREIGN PATENT DOCUMENTS

| | | | |
|---|---|---|---|
| 0003695 | 1/1986 | Japan | 219/121 LK |
| 0017391 | 1/1986 | Japan | 219/121 LN |

*Primary Examiner*—C. L. Albritton
*Attorney, Agent, or Firm*—Edward L. Kochey, Jr.

[57] ABSTRACT

Air diffuser openings are machined in hollow gas turbine blades. The blade is supported in alignment with a laser machining beam and rotatable around several perpendicular axes. It is simultaneously rotated about both axes whereby a substantially hourglass shape is machined out of the blade. The root of the hourglass shape may thereafter be enlarged.

6 Claims, 2 Drawing Sheets

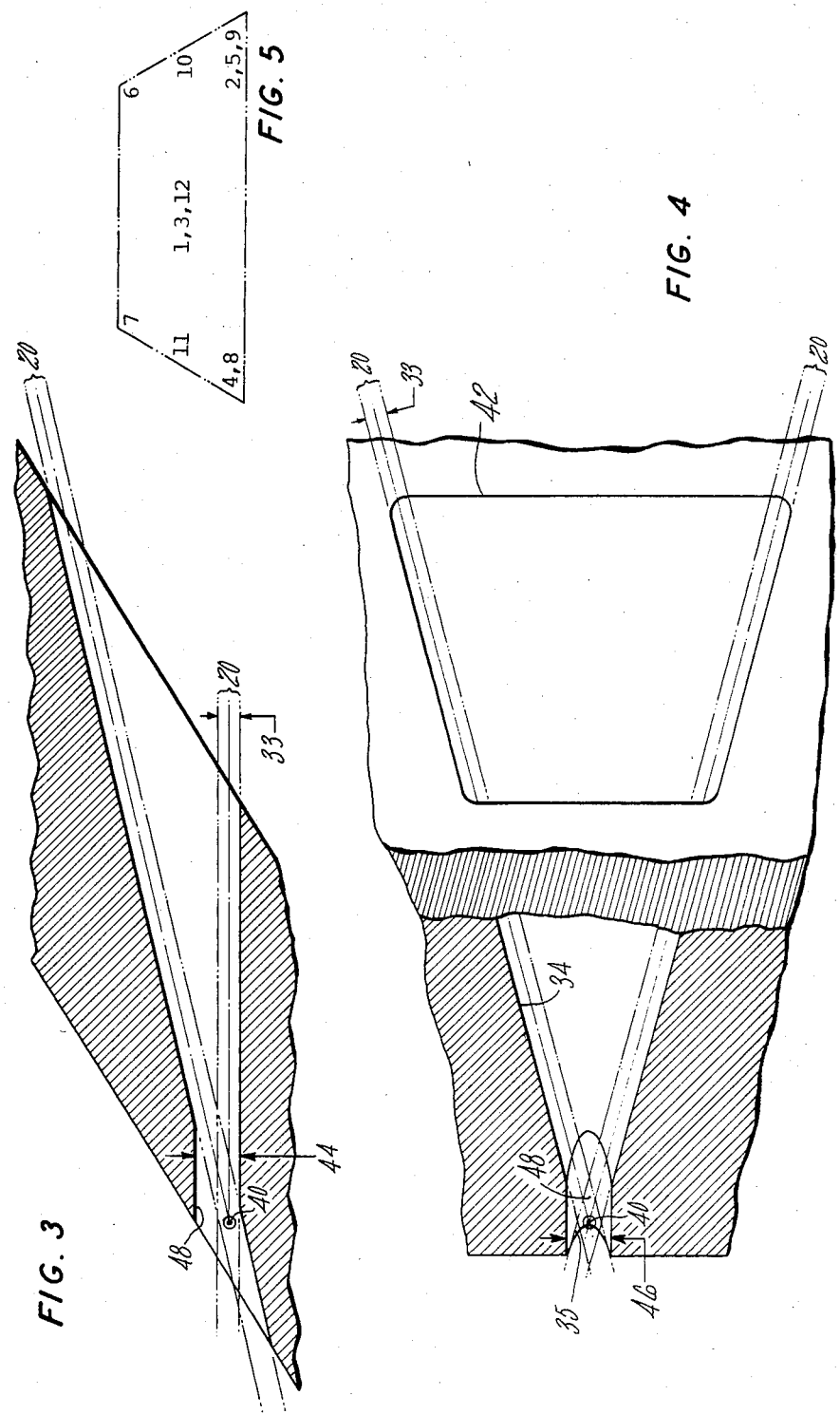

LASER MACHINING METHOD

DESCRIPTION

Technical Field

The invention relates to laser machining and in particular to a method of machining air coolant diffuser openings in gas turbine blades.

Gas turbine blades operating in high temperature gas are often hollow blades with an air coolant passageway therethrough. Openings through the blade from the inner coolant passage permit the coolant to flow out thereby permitting a coolant flow, passing coolant through the material of the blade itself to cool it and also providing a film cooling of the outer surface of the blade. A diffuser shape of the opening lowers the terminal velocity thereby increasing the effectiveness of the film cooling of the blade surface.

Optimum use of such air coolant requires consistent and predictable flow through the multiplicity of holes. Prior art methods of machining these openings have been expensive, time consuming, and of such a nature to produce erratic and noncentered flow paths thereby leading to variations in flow.

DISCLOSURE OF THE INVENTION

A gas turbine blade is mounted with the portion in which the air diffuser opening is to be machined located in alignment with the axis of a laser machining beam. The blade is mounted rotatably around two mutually perpendicular rotation axes with at least one rotation axis being perpendicular to the axis of said laser machining beam. The laser beam is fired and the gas turbine blade is preferably simultaneously rotated around both perpendicular rotation axes in a preselected pattern wherein a substantially hourglass shape is machined through the wall of the turbine blade. Thereafter, the blade is maintained in a fixed rotational position and translated with respect to the laser beam to machine a parallel-sided flow-restricting opening in the root of the hourglass shape.

BRIEF DESCRIPTION OF THE DRAWINGS

FIG. 3 is an elevation sectional view through a machined diffuser opening.

FIG. 4 is a plan partial sectional view through a machine diffuser opening.

FIG. 5 is a schematic illustrating the order of machining a single diffuser opening.

BEST MODE FOR CARRYING OUT THE INVENTION

Figure 1:
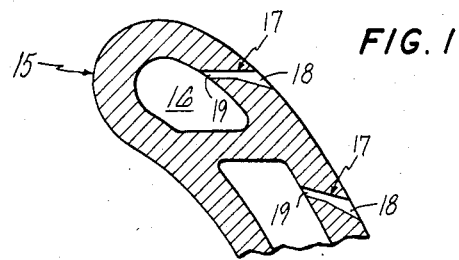
FIG. 1 is a partial section through a gas turbine blade showing a diffuser opening.

There is illustrated in FIG. 1 a gas turbine blade 15 with an internal flow passage 16 and holes or coolant openings 17 within the walls of the gas turbine blade. Each of the openings 17 has a diffuser shaped portion 18 and a flow limiting portion 19.

Figure 2:
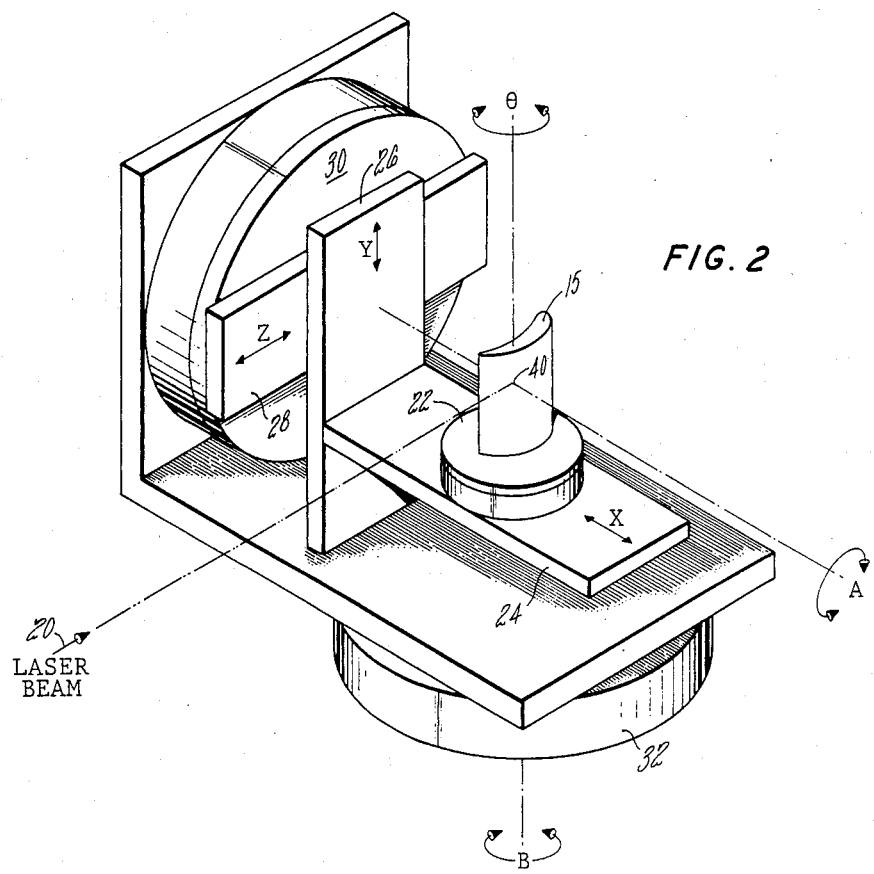
FIG. 2 is a simplified arrangement of the support structure for holding the turbine blade during laser machining.

For machining purposes the blade 15 is mounted on the apparatus of FIG. 2 with the blade being in alignment with laser beam 20. The blade is mounted to rotary 22 which is rotatable around axis $\theta$. This rotary is secured to slide 24 in such a manner as to be translatable in the x direction. Slide 24 in turn is mounted to slide 26 in a manner to be translatable in the y direction. Similarly, slide 26 is mounted to slide 28 in a manner so as to be translatable in the z direction.

Rotary 30 permits the entire apparatus to be rotated about the A axis while rotary 32 permits the entire assembly to be rotated about the B axis. Axis A and axis B are perpendicular to each other and intersect the laser beam 20 with each axis being perpendicular to the laser beam.

The blade 15 is mounted in the support apparatus with a common point 40 being at the intersection of laser beam 20, axis A and axis B.

With the gas turbine blade rotated around the A and $\theta$ axis it moves with respect to the fixed laser beam 20 with FIGS. 3 and 4 illustrating the outboard or extreme positions of the laser beam with respect to the gas turbine blade. The laser beam 20 is of 0.012 inches outside diameter shown by dimension 33. It can be seen that in addition to the substantially conical section 34 on the right there is a flare 35 to the left of common point 40, whereby a substantially hourglass shape is formed. The preferred cross-sectional shape is not circular to form a conventional cone but is substantially rectangular as indicated by the surface cut 42 of FIG. 4.

It can be seen that the opening at the root 40 of the hourglass is of the same diameter as the machining beam 20. It is normally desired that this flow restriction point by of slightly greater diameter and have some reasonable length. Accordingly, a larger opening such as 44 in the elevational view and 46 in the plan view is desirable. Therefore, after the hourglass shape is machined, the gas turbine blade is held fast against rotation and translated circularly with respect to the laser beam to cut the parallel sides 48 of the opening at the root of the hourglass.

FIG. 5 illustrates the preferred method of moving the laser beam within the opening to be machined out. Attempts to trepan only the outside edges of this opening have led to difficulties with respect to irregularities in the surface and plugging of the opening with the piece cut loose by the trepanning. Accordingly, the relative position of the laser beam in the workpiece is set to position 1 of FIG. 5 and a laser fired at this time to drill through the workpiece at the selected location. With firing continuing the beam is moved to point 2 back to point 3 and down to point 4. This operation cuts a hole through the piece to be machined so the molten metal can be more easily ejected and also removes the majority of the material in the center of the opening.

The laser is then moved over to point 5, then through 6 and 7, and back to 8 completing a pass around the perimeter. It thereafter is moved again to point 9 to clean up this surface which may be roughened because of the amount of metal ejected during the first pass. It continues up through points 10 and 11 returning to 12 at which point the machining operation is complete and the laser is blanked while moving to the position 1 of the next hole.

The interior of the blade may be filled with a sacrificial material such as epoxy prior to machining. This is selected in an amount to prevent the laser beam from penetrating the far side of the blade. It is removed after the machining operation by furnace burn out.

I claim:

1. A method of laser machining air diffuser openings in hollow gas turbine blades comprising:

mounting a gas turbine blade in alignment with the axis of a laser machining beam, said mounted blade being rotatable around two perpendicular rotation axes, at least one of said rotation axis being perpendicular to the axis of said laser machining beam, whereby a zero translation point exists at the intersection of the two rotation axis and laser beam axis when the gas turbine blade is rotated around either rotation axis;

firing said laser;

simultaneously rotating said mounted blade around both rotation axes in a preselected pattern and machining a substantially hourglass shape out of said turbine blade.

2. A method as in claim 1:

each of said rotation axis being perpendicular to the axis of said laser machining beam.

3. The method of claim 2 including also:

thereafter maintaining said blade in a fixed rotational position with respect to said two perpendicular rotational axes and translating said blade in a plane perpendicular to said laser beam while simultaneously firing said laser beam, and thereby machining a parallel sided opening through the root of said hourglass shape.

4. The method of claim 2 wherein the step of machining a parallel-sided opening comprises machining a cylindrical opening through the root of said hourglass shape.

5. The method of claim 2 including rotating said mounted blade in a manner to form a rectangular surface pattern on said blade.

6. The method as in claim 2 including rotating said mounted blade in a manner to machine a central portion of said hourglass shape before machining the edges of said hourglass shape.

* * * * *